United States Patent
Qiu et al.

(10) Patent No.: US 9,958,955 B2
(45) Date of Patent: May 1, 2018

(54) KEY FUNCTION CONVERSION METHOD, KEY FUNCTION CONVERSION DEVICE AND ELECTRONIC EQUIPMENT

(71) Applicant: SUZHOU SNAIL TECHNOLOGY DIGITAL CO., LTD, Suzhou (CN)

(72) Inventors: Jian Qiu, Shenzhen (CN); Weibin Han, Shenzhen (CN); Hongjian Wu, Shenzhen (CN); Heting Zheng, Shenzhen (CN); Jianfeng Li, Shenzhen (CN)

(73) Assignee: SUZHOU SNAIL TECHNOLOGY DIGITAL CO., LTD. (CN)

( * ) Notice: Subject to any disclaimer, the term of this patent is extended or adjusted under 35 U.S.C. 154(b) by 235 days.

(21) Appl. No.: 14/322,755

(22) Filed: Jul. 2, 2014

(65) Prior Publication Data

US 2016/0004324 A1 Jan. 7, 2016

(51) Int. Cl.
*G06F 3/02* (2006.01)
*G06F 3/023* (2006.01)

(52) U.S. Cl.
CPC ............ *G06F 3/0227* (2013.01); *G06F 3/023* (2013.01); *G06F 3/0238* (2013.01)

(58) Field of Classification Search
CPC .... G06F 3/0238; G06F 3/0412; G06F 3/0219; H04M 1/7258
USPC .................................. 345/157, 168, 172–173
See application file for complete search history.

(56) References Cited

U.S. PATENT DOCUMENTS

| | | | | |
|---|---|---|---|---|
| 6,604,878 B1* | 8/2003 | Wong | ...................... | G06F 3/018 400/110 |
| 2004/0263480 A1* | 12/2004 | Pagan | ................... | G06F 3/0238 345/172 |
| 2006/0152495 A1* | 7/2006 | Gombert | ............ | G06F 3/03543 345/172 |
| 2006/0190836 A1* | 8/2006 | Ling Su | ................ | G06F 1/1616 715/773 |
| 2006/0282791 A1* | 12/2006 | Bogomolov | .......... | G06F 3/0236 715/773 |
| 2007/0035521 A1* | 2/2007 | Jui | ........................ | G06F 3/0426 345/168 |
| 2008/0136783 A1* | 6/2008 | Pedrazzoli | .............. | G06F 3/023 345/172 |
| 2009/0183098 A1* | 7/2009 | Casparian | ............. | G06F 3/0238 715/765 |
| 2009/0237361 A1* | 9/2009 | Mosby | ................ | G06F 3/04883 345/173 |

* cited by examiner

*Primary Examiner* — Calvin C Ma
(74) *Attorney, Agent, or Firm* — Hayes Soloway P.C.

(57) ABSTRACT

Disclosed in the embodiments of the present invention is a key function conversion method, comprising: detecting a click operation sent by a first key; searching for a second key associated to the first key in a preset key mapping table; converting the click operation sent by the first key into a click operation sent by the second key; and, generating a function trigger signal corresponding to the click operation sent by the second key. A key function conversion device and a key function conversion electronic equipment are also disclosed in the embodiments of the present invention. With the present invention, the compatibility of a terminal unit with application programs can be improved.

15 Claims, 3 Drawing Sheets

_US 9,958,955 B2_

KEY FUNCTION CONVERSION METHOD, KEY FUNCTION CONVERSION DEVICE AND ELECTRONIC EQUIPMENT

I. TECHNICAL FIELD

The present invention relates to the field of electronics, in particular to a key function conversion method, a key function conversion device, and a key function conversion electronic equipment.

II. BACKGROUND

Keyboard is one of the most common input devices. It is widely used on various terminal units, such as computers, etc. An operator can input various instructions and data with a keyboard to a terminal unit, and can utilize the keyboard and a display conveniently communicate with the terminal unit. As different kinds of portable devices emerge, terminal units are limited in size, and accordingly the number of keys on the keyboard on such terminal units is limited. For example, on a portable device such as a Personal Digital Assistants (PDA) or a mobile phone, the number of keys on the keyboard (or keypad) is very small. Consequently, when running some application programs on such a device, the situation may arise, that required for using some specific keys, hut the key is not provided for on keyboard (or keypad). In addition, since the function of each key on the keyboard is fixed, many application programs are not compatible well with such a terminal unit.

III. CONTENTS OF THE INVENTION

A technical problem to be solved in the embodiments of the present invention is to provide a key function conversion method, a key function conversion device, and key function conversion electronic equipment. The present invention is to solve the problem that an application program may be incompatible when ported to a terminal unit in the prior art, because the missing of required keys on the terminal unit.

To solve the technical problem described above, in the embodiments of the present invention, a key function conversion method is provided, comprising:

detecting a click operation sent by a first key;

searching for a second key associated to the first key in a preset key mapping table, and converting the click operationclick operation sent by the first key into a click operationclick operation sent by the second key; generating a function trigger signal corresponding to the click operationclick operation sent by the second key.

Accordingly, in the embodiments of the present invention, a key function conversion device is provided, comprising:

a detecting module, designed to detect a click operation sent by a first key;

a converting module, designed to search for a second key associated to the first key in a preset key mapping table and convert the click operation sent by the first key into a click operation sent by the second key;

a generating module, designed to generate a function trigger signal corresponding to the click operation sent by the second key.

Moreover, in the embodiments of the present invention, an electronic equipment comprising the key function conversion device described above is provided.

The embodiments of the present invention attain the following beneficial effects: With a key mapping table, an operating instruction issued by the user by clicking a first key is converted into an operating instruction the sent by a second key; in that way, the key, functions can be converted dynamically, and thus the phenomenon that functions of an application program ported to a terminal unit can't be implemented owing to limited number of keys on the objective terminal unit can be avoided, and the compatibility of the terminal unit with application programs ported to the terminal unit is improved.

IV. DESCRIPTION OF DRAWINGS

To make the technical scheme in the embodiments of the present invention or in the prior art understood better, hereunder the accompanying drawings used in the description of the embodiments or the prior art will be introduced briefly. Apparently, the accompanying drawings described below only illustrate some embodiments of the present invention. Those having ordinary skills in the art can obtain drawings of other embodiments on the basis of these drawings without creative labor.

V. SPECIFIC EMBODIMENTS

Hereunder the technical scheme in the embodiments of the present invention will be detailed clearly and completely with reference to the accompanying drawings in the embodiments of the present invention. Apparently, the described embodiments are only some embodiments of the present invention, but not all embodiments of the present invention. All other embodiments obtained by those having ordinary skills in the art without creative labor, on the basis of the embodiments provided here shall be deemed as falling into the protected domain of the present invention.

Figure 1:
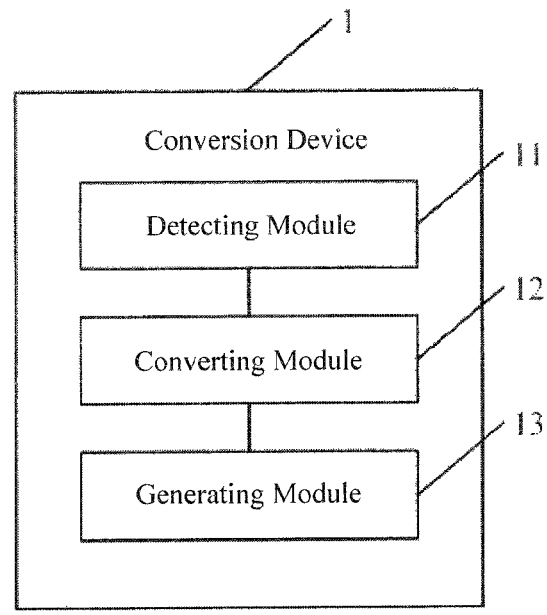
FIG. 1 is a schematic diagram of a structure of the key function conversion device in an embodiment of the present invention.

Please see FIG. 1, which is a schematic diagram of a structure of the key function conversion device (hereinafter referred to as conversion device 1 for short) in an embodiment of the present invention. The conversion device 1 comprises:

a detecting module 11, designed to detect a click operation sent by a first key;

specifically, when a first key on the keyboard is clicked, the detecting module 11 ascertains the position of the clicked first key by detecting the level change of the key on keyboard, for example, for a matrix keyboard, the detecting module ascertains the position of a clicked key according to a crossing point between row line and column line in which the level has changed; the detection of a click operation sent by the first key can be implemented in other way, and there is no specific restriction on that in this embodiment;

a converting module 12, designed to search for a second key associated to the first key in a preset key mapping table and convert the click operation sent by the first key into a click operation sent by the second key;

specifically, mapping relations between the keys on the keyboard, for example, the mapping relation between a first key and a second key, are stored in the key mapping table, and the mapping relations can be modified, deleted, and updated; suppose the key mapping table contains the mapping relation between key 'A' and key 'Space' (Spacebar), when the detecting module 11 detects a click operation on key 'A', it will inform the converting module 12 of the detection result, then, according to the detection result, the converting module 12 searches in the key mapping table and finds that key 'Space' is associated to key 'A', and converts the click operation sent by key 'A' to the click operation sent by key 'Space';

a generating module 13, designed to generate a function trigger signal corresponding to the click operation sent by the second key;

specifically, in the case described above, for example, the second key is key 'Space', and the generating module 13 generates a function trigger signal of leaving a blank space on the display screen, according to the click operation sent by key 'Space'.

In the embodiment of the present invention, with a key mapping table, an operating instruction issued by the user by clicking a first key can be converted into an operating instruction sent by a second key; in that way, the key functions can be converted dynamically, and thus the phenomenon that functions of an application program ported to a terminal unit can't be implemented owing to limited number of keys on the objective terminal unit can be avoided, and the compatibility of the terminal unit with application program ported to the terminal unit is improved.

Figure 2:
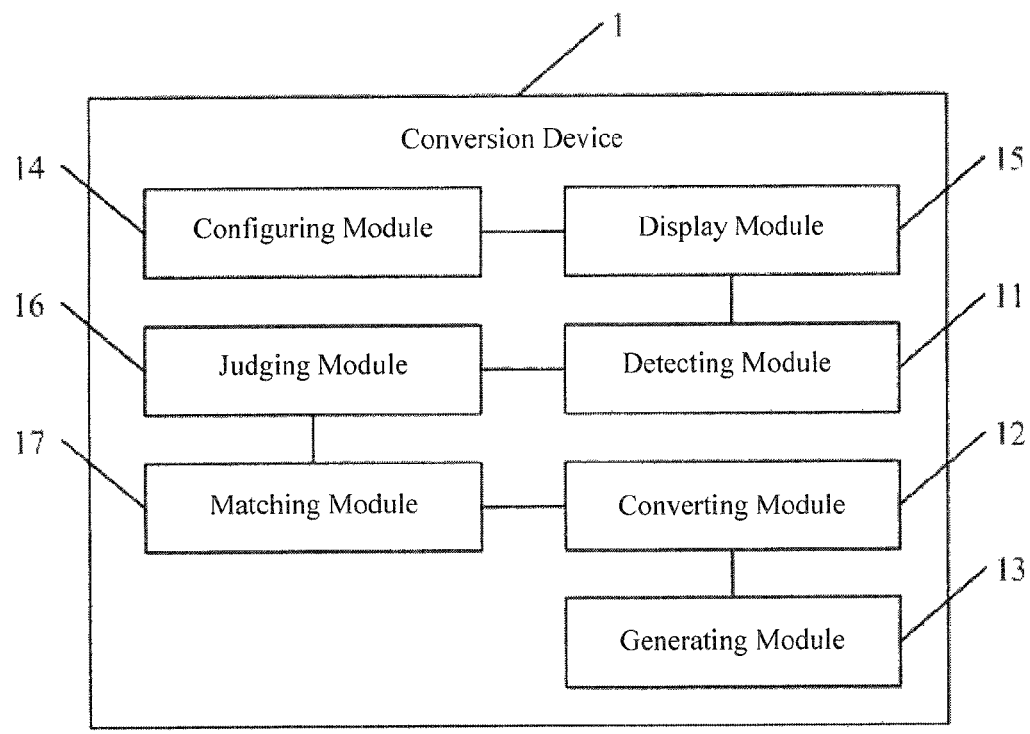
FIG. 2 is a schematic diagram of another structure of the key function conversion device in an embodiment of the present invention.
Figure 3:
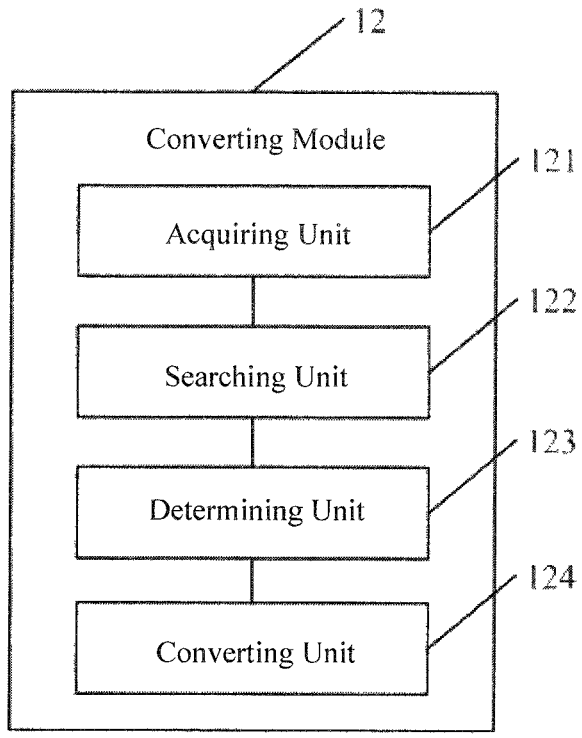
FIG. 3 is a schematic structural diagram of the converting module shown in FIG. 2.

Please see FIG. 2 and FIG. 3, which show schematic diagrams of another structure of the key function conversion device in an embodiment of the present invention. Besides the detecting module 11, converting module 12, and generating module 13, the conversion device further comprises:

a configuring module 14, designed to configure the mapping relation between a first key and a second key and save the mapping relation into the key mapping table;

specifically, suppose the first key on the keyboard is key 'W' and the second key is key 'Up', the configuring module 14 would associate key 'W' with key 'Up', and save the mapping relation between key 'W' and key 'Up' into the key mapping table; alternatively, the configuring module 14 can associate key 'W' with another key as required, and saves the mapping relation into the key mapping table; wherein, the key mapping table stores at least one set of mapping relations between keys, for example, key 'W' is mapped to key 'Up', key 'S' is mapped to key 'Down', key 'A' is mapped to key 'Left', and key 'D' is mapped to key 'Right', the mapping relation can be certainly other mapping relation, and can be defined by the user as required;

a display module 15, designed to display an interactive interface for configuring the mapping relation between a first key and a second key on the device where the first key exists, so that the mapping relation can be viewed;

specifically, when the mapping relation between a first key and a second key is configured by the configuring module 15, the display module 15 displays a configuration interface, so that the user can view the update, modification, and deletion operations for the mapping relations;

a judging module 16, designed to judge whether the click operation sent by a first key should be converted, and, if the click operation should be converted, the judging module 16 would instruct the converting module 12 to execute the conversion, and if not, the default operating instruction corresponding to the click operation sent by the first key would be executed;

specifically, the judging module 16 judges whether the click operation sent by a first key should be converted with the following image method: determining whether a conversion is required according to an instruction issued by the user, or determining according to the predefined settings of the conversion device, and there is no specific restriction on the method of judgment in the present invention; if the judging module 16 determines that a conversion is required, it will inform the converting module 12 to execute the conversion; otherwise the default operating instruction corresponding to the click operation sent by the first key will be executed, for example, suppose the first key is key 'A', a character 'A' will be displayed on the display screen;

a matching module 17, designed to ascertain whether a key mapping table matching the current device exists according to the ID information of the current device, and, if such a key mapping table exists, import the key mapping table into the memory of the current device; otherwise request for the key mapping table from a server through a wireless or wired network.

Wherein, the converting module 12 comprises:

an acquiring unit 121, designed to acquire a first key value corresponding to the first key; a searching unit, designed to search for a second key value associated to the first key value in the key mapping table, according to the first key value;

a determining unit 122, designed to determine a second key corresponding to the second key value;

a converting unit 123, designed to convert a click operation sent by the first key into a click operation sent by the second key.

In the embodiment of the present invention, with a key mapping table, an operating instruction issued by the user by clicking a first key is converted into an operating instruction corresponding to the click operation sent by a second key; in that way, the key functions can be converted dynamically, and thus the phenomenon that specific functions of an application program ported to a terminal unit can't be implemented owing to limited number of keys on the objective terminal unit can be avoided, and the compatibility of the terminal unit with application program ported thereon is improved.

Figure 4:
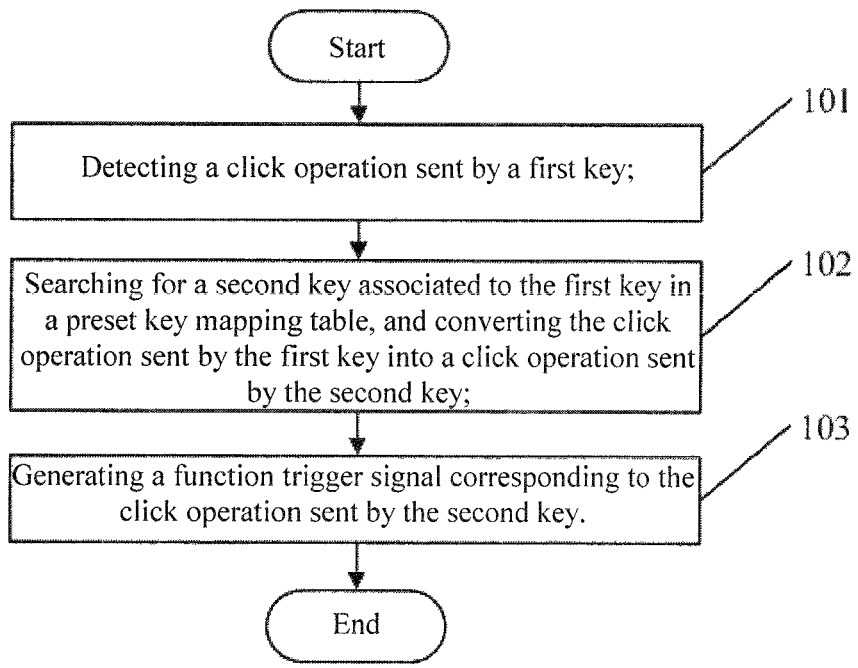
FIG. 4 is a flow chart of the key function conversion method in an embodiment of the present invention.

Please see FIG. 4, which is a flow chart of the key function conversion method of the present invention. The method comprises:

step 101: detecting a click operation sent by a first key;

step 102: searching for a second key associated to the first key in a preset key mapping table, and converting the click operation sent by the first key into a click operation sent by the second key;

step 103: generating a function trigger signal corresponding to the click operation sent by the second key.

In the embodiment of the present invention, with a key mapping table, an operating instruction issued by the user by clicking a first key can be converted into an operating instruction sent by a second key; in that way, the key functions can be converted dynamically, and thus the phenomenon that functions of an application program ported to a terminal unit can't be implemented owing to limited number of keys on the objective terminal unit can be avoided, and the compatibility of the terminal unit with application program ported thereon is improved.

Figure 5:
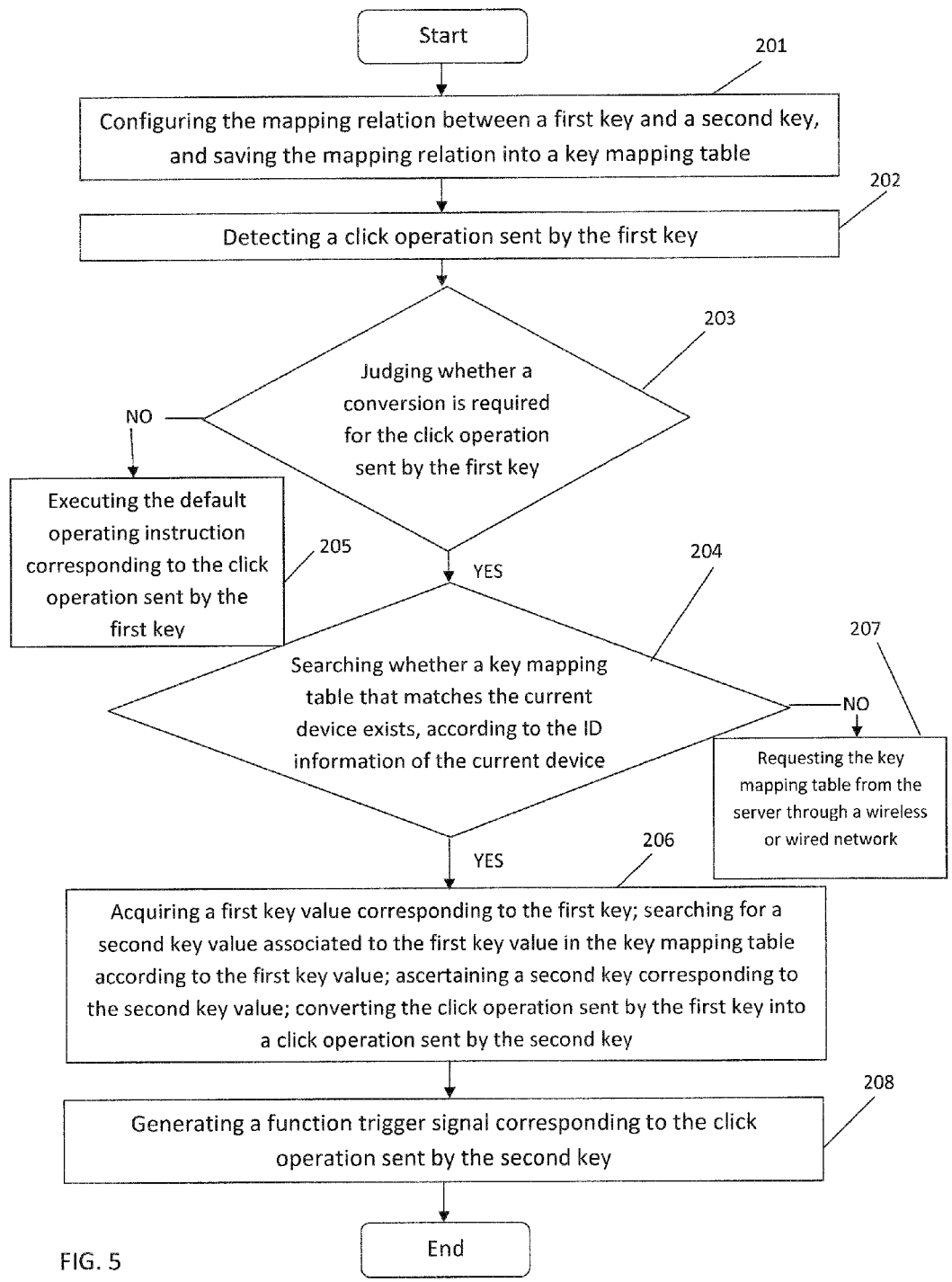
FIG. 5 is an another flow chart of the key function conversion method in an embodiment of the present invention.

Please see FIG. 5, which is a flow chart of another process of the key function conversion method of the present invention. The method comprises:

step 201: configuring the mapping relation between a first key and a second key and saving the mapping relation into the key mapping table;

specifically, suppose the first key on the keyboard is key 'W' and the second key is key 'Up', the configuring module 14 would associate key 'W' with key 'Up', and save the mapping relation between key 'W' and key 'Up' into the key mapping table, alternatively, the configuring module 14 can associate key 'W' with other key as required, and saves the mapping relation into the key mapping table; wherein, the key mapping table stores at least one set of mapping relations between keys, for example, key 'W' is mapped to key 'Up', key 'S' is mapped to key 'Down', key 'A' is mapped to key 'Left', and key 'D' is mapped to key 'Right', the mapping relation can be certainly other mapping relation, and can be defined by the user as required;

step 202: detecting a click operation sent by a first key;

specifically, when a first key on the keyboard is clicked, the detecting module 11 ascertains the position of the first key by detecting the level fluctuation of the key, for example, for a matrix keyboard, the detecting module ascertains the position of a clicked key according to a crossing point between row line and column line in which the level has changed; the detection of a click operation sent by the first key can be implemented in other way, and there is no specific restriction on that in this embodiment;

step 203: judging whether a conversion operation for the click operation sent by the first key is required;

specifically, the judging module 16 judges whether click operation sent by a first key should be converted with the following image method: determining whether a conversion is required according to an instruction issued by the user, or determining that according to the predefined settings of the conversion device, and there is no specific restriction on the method of judgment according to the present invention; if the judging module 16 determines that a conversion is required, step 204 will be executed; otherwise step 205 will be executed;

step 204: searching whether a key mapping table matching the current device exists according to the ID information of the current device;

specifically, if such a key mapping table exists, step 206 will be executed; otherwise step 207 will be executed;

step 205: executing the default operating instruction corresponding to the click operation sent by the first key;

step 206: acquiring a first key value corresponding to the first key; searching for a second key value associated to the first key value in the key mapping table, according to the first key value; ascertaining a second key corresponding to the second key value; converting the click operation sent by the first key into a click operation sent by the second key;

step 207: requesting for the key mapping table from a server through a wireless or wired network;

step 208: generating a function trigger signal corresponding to the click operation sent by the second key.

In the embodiment of the present invention, with a key mapping table, an operating instruction issued by the user by clicking a first key can be converted into an operating instruction sent by a second key; in that way, the key functions can be converted dynamically, and thus the phenomenon that functions of an application program ported to a terminal unit can't be implemented owing to limited number of keys on the terminal unit can be avoided, and the compatibility of the terminal unit with application program ported thereon is improved.

Those having ordinary skills in the art can understand that the process of the methods in the above embodiments can be accomplished in part or in entirety by utilizing a computer program to instruct relevant hardware, the computer program can be stored in a computer readable storage medium, and the program can comprise the process of the embodiments of the methods described above when it is executed. Wherein, the storage medium can be a magnetic disk, optical disk, Read-Only Memory (ROM), or Random Access Memory (RAM), etc.

While the present invention is described and disclosed above in some preferred embodiments, the present invention is not limited to those embodiments. Those having ordinary skills in the art can appreciate that any equivalent modification or variation that can implement the process in the embodiments described above in part or in entirety on the basis of the claims of the present invention is deemed as falling in the protected scope of the present invention.

The invention claimed is:

1. A key function conversion method, comprising:
   detecting a click operation sent by a first key on a keyboard or a keypad of a device, wherein the device has corresponding ID information thereof;
   searching for a key mapping table matching the device based on the ID information of the device, and determining whether the key mapping table matching the device ID information exists, wherein if the key mapping table matching the device ID information exists, importing the key mapping table matching the device ID information into a memory of the device, and wherein, if the key mapping table matching the device ID information does not exist, requesting the key mapping table from a server through a network connection;
   searching for a second key associated to the first key in the matching key mapping table within the memory of the device, and converting the click operation sent by the first key into a click operation sent by the second key;
   generating a function trigger signal corresponding to the click operation sent by the second key.

2. The conversion method as set forth in claim 1, further comprising the following step before the step of detecting a click operation sent by a first key on the keyboard or the keypad:
   configuring the mapping relation between a first key and a second key and saving the mapping relation into the key mapping table.

3. The conversion method as set forth in claim 2, wherein, the step of searching for a second key associated to the first key in the key mapping table and converting the click operation sent by the first key into a click operation sent by the second key comprises:
   acquiring a first key value corresponding to the first key;
   searching for a second key value associated to the first key value in the key mapping table, according to the first key value;
   ascertaining a second key corresponding to the second key value;
   converting the click operation sent by the first key into a click operation sent by the second key.

4. The conversion method as set forth in claim 3, further comprising:
   displaying an interactive interface for configuring the mapping relation between a first key and a second key on the device where the first key exists, so that the mapping relation can be viewed.

5. The conversion method as set forth in claim 4, further comprising the following steps before the step of searching for a second key associated to the first key in the key mapping table and converting the click operation sent by the first key into a click operation sent by the second key:

judging whether a conversion is required for the click operation sent by the first key, and, if such a conversion is required, executing the step of searching for a second key associated to the first key in the key mapping table and converting to the click operation sent by the first key into a click operation sent by the second key;

otherwise executing the default operating instruction corresponding to the click operation on the first key.

6. A key function conversion device comprising:

a detecting module, designed to detect a click operation sent by a first key on a keyboard or keypad of a device, wherein the device has corresponding ID information thereof;

a converting module, designed to search for a second key associated to the first key in a key mapping table and convert the click operation sent by the first key into a click operation sent by the second key, wherein the key mapping table is searched for based on a match with the ID information of the device, and a determination of the existence of the key mapping table matching the device ID information is made, wherein if the key mapping table matching the device ID information exists, the key mapping table matching the device ID information is imported into a memory of the device, and wherein, if the key mapping table matching the device ID information does not exist, the key mapping table is requested from a server through a network connection;

a generating module, designed to generate a function trigger signal corresponding to the click operation sent by the second key.

7. The conversion device as set forth in claim 6, further comprising:

a configuring module, designed to configure the mapping relation between a first key and a second key and save the mapping relation into the key mapping table.

8. An electronic device comprising the conversion device as described in claim 7.

9. The conversion device as set forth in claim 7, wherein, the converting module comprises:

an acquiring unit, designed to acquire a first key value corresponding to the first key;

a searching unit, designed to search for a second key value associated to the first key value in the key mapping table, according to the first key value;

a determining unit, designed to determine a second key corresponding to the second key value;

a converting unit, designed to convert a click operation sent by the first key into a click operation sent by the second key.

10. An electronic device comprising the conversion device as described in claim 9.

11. The conversion device as set forth in claim 9, further comprising:

a display module, designed to display an interactive interface for configuring the mapping relation between a first key and a second key on the device where the first key exists, so that the mapping relation can be viewed.

12. An electronic device comprising the conversion device as described in claim 11.

13. The conversion device as set forth in claim 11, further comprising:

a judging module, designed to judge whether the click operation sent by a first key should be converted, and, if the click operation should be converted, instructs the converting module to execute the conversion; otherwise execute the default operating instruction corresponding to the click operation sent by the first key.

14. An electronic device comprising the conversion device as described in claim 13.

15. An electronic device comprising the conversion device as described in claim 6.

* * * * *